April 25, 1961 M. E. HAMILTON 2,981,345
DISK HARROW CONSTRUCTION
Filed Jan. 3, 1957 2 Sheets-Sheet 1

INVENTOR
MATTHEW E. HAMILTON
BY
Emerson B Donnell
ATTORNEY

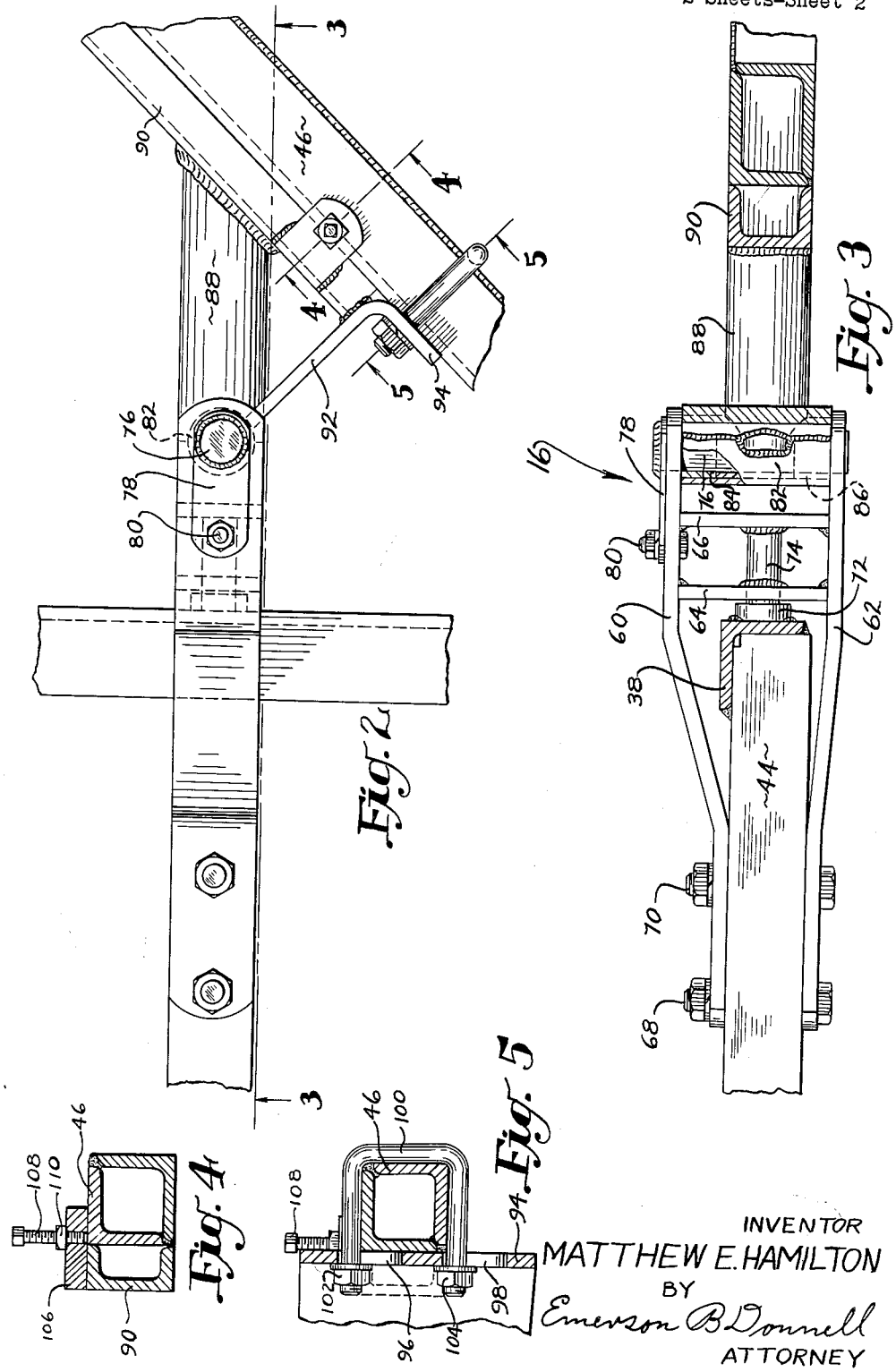

United States Patent Office
2,981,345
Patented Apr. 25, 1961

2,981,345

DISK HARROW CONSTRUCTION

Matthew E. Hamilton, Stockton, Calif., assignor to J. I. Case Company, Racine, Wis., a corporation of Wisconsin Filed Jan. 3, 1957, Ser. No. 632,372

5 Claims. (Cl. 172—597)

The present invention relates to agricultural implements, particularly to disk harrows and especially of the type known as offset disk harrows characterized by a single front and a single rear harrow gang hinged together and commonly so adjusted as to run to one side of the path of a propelling vehicle or tractor. In all disk harrow gangs there is a normal tendency for the end of the gang adjacent the particular end disk which presents its concave surface to the earth, to cut deeper than the other end so that, without some kind of control, the gang will always travel in a slightly inclined position as related to the horizontal. Since the two gangs in an offset harrow are oppositely oriented or, in other words, so positioned that the concave sides of the disks face one way in the forward gang and the opposite way in the rear gang, this tilting tendency is opposite in the two gangs as is well known. Commonly in disk harrows the tilting of one gang is balanced against the other so that the two neutralize each other and both gangs run level. However, in an offset harrow the major or only connection between the gangs is the hinge, and as a result there is a considerable concentration of stress in the hinge and in the neighboring parts of the gang frames to which the hinge is attached, and a further object of invention is to provide a hinge which will be strong enough to withstand the stress and which is so attached as to avoid excessive concentration of stress in the frame. A further object is to provide such a hinge which may be adjusted in its relation to the frames so as to insure that the compensation or leveling effect of one gang on the other will be sufficient for the prevailing conditions and not excessive.

Offset disk harrows of this general type are commonly pulled by a drawbar, and conditions sometimes require offsetting from the tractor larger or smaller amounts, or even offsetting to opposite sides of the tractor path from time to time and it is another object of the invention to provide a drawbar structure which is readily adaptable to offsetting at either side of the tractor and which is adjustable in small increments for a very close adjustment of the travel path when required.

Further objects and advantages will be apparent from the following description and drawings in which:

Fig. 2 is an enlarged plan view, with parts omitted and others broken away, of a portion of the mechanism shown in Fig. 1.

Fig. 3 is a vertical section on the line 3—3 of Fig. 2.

Fig. 4 is a vertical section on the line 4—4 of Fig. 2.

Fig. 5 is a vertical section on the line 5—5 of Fig. 2.

Figure 1:
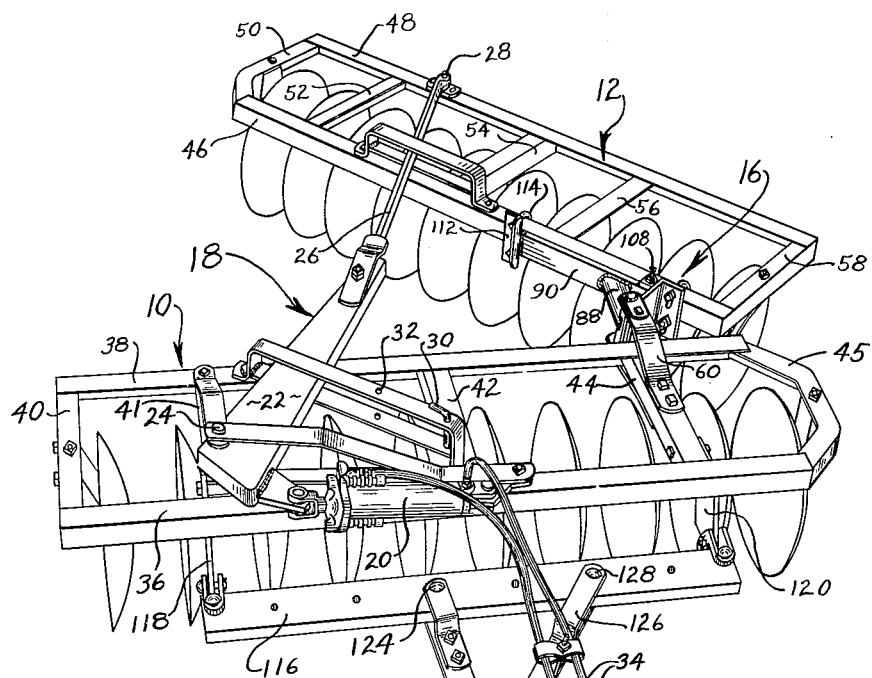
Fig. 1 is a perspective view taken from the front and above of a disk harrow embodying the invention.

As seen in Fig. 1, the disk harrow comprises front and rear harrow gangs generally designated as 10 and 12 respectively, a draft structure 14 being connected to gang 10 as will appear, and gang 10 being connected to gang 12 by means of a hinge structure 16 which will be described in detail. Mechanism 18 is provided for swinging gangs 10 and 12 in well-known manner about hinge 16 from the position shown to a position in which the gangs are substantially parallel for transportation or movement without ground-cutting action.

Mechanism 18 is commonly so constituted to assist hinge 16 in resisting the tendency of the left end of the front gang (as seen in Fig. 1) to run too deep and the left end of the rear gang to run too shallow, but this feature forms no part of the present invention and will therefore not be described in detail, it being sufficient to say that a fluid pressure cylinder or motor 20 actuates a substantially rigid link 22 pivoted on gang 10 at 24, link 22 being pivoted to a link 26 forming the other member of a toggle-like assemblage, and pivoted to gang 12 at 28. Swinging of link 22 in a clockwise direction, as will be apparent, will draw gangs 10 and 12 together and thus afford ready control of the angle between gangs 10 and 12. A pin 30 may be removed and placed in a hole 32 to retain link 22 in position after such clockwise rotation so that cylinder 20 may be removed for other purposes when the harrow is not being used, the latter however being nevertheless retained in condition for transportation by pin 30 acting against link 22. Hose lines 34 are connected with cylinder 20 and supply and withdraw pressure fluid for cylinder 20 from a source not shown but commonly on the tractor.

Gangs 10 and 12 have suitable frames, gang 10 including a front transverse frame bar 36 and a rear frame bar 38 connected by fore and aft extended struts 40, 41, 42, 44, and 45. In somewhat similar manner rear gang 12 has a front frame bar 46 and a rear frame bar 48 connected by struts 50, 52, 54, 56, and 58. While these frames are strong enough for their intended purpose, in the past the connections of the hinge commonly used would cause excessive stress in the frame bars and breakage was common in the neighborhood of the hinge. In the present instance, the hinge is so organized as to avoid such stress concentration.

Turning to Figs. 2 and 3, hinge 16 includes a yoke-like assemblage including upper and lower legs 60 and 62 which are connected by spacer bars 64 and 66, legs 60 and 62 extending forwardly and being securely fastened respectively to the upper and lower surfaces of above-mentioned strut 44 by means of bolts of suitable type 68 and 70. As hereinbefore mentioned, strut 44 is connected to rear frame bar 38, the latter having on its rear surface a socket or bearing 72 into which projects in pivotal relation a pivot element or pin 74 in the present instance being securely supported by passing through spacer bar 64 and being welded or otherwise securely fastened to it and spacer bar 66. In this manner yoke members 60 and 62 are securely located in relation to frame bar 38 and strut 44 insofar as up-and-down relative movement is concerned, but extreme stress in the direction of rotation about the axis of pivot member 74 (as would arise from any upward tendency in the left end of gang 12) will be relieved by a slight twisting and displacement of yoke portions 60 and 62, these being of suitable material so that such distortion will be in the nature of the yielding of a spring, and will not cause any permanent distortion or damage. In this manner the stress imparted to strut 44 cannot exceed that possible by reason of the stiffness of members 60 and 62 and is well within the capacity of the frame members to withstand.

Yoke members 60 and 62 carry a pin 76 which, to insure it against turning in the relatively thin members 60 and 62, has a plate 78 welded or otherwise securely united therewith and secured to member 60 at a little distance from pin 76 as by a bolt 80. In this way the wear incident to swinging or angling movement in the hinge will not be concentrated on the relatively limited surfaces in the ends of members 60 and 62, nor on the corresponding surfaces of pin 76.

A sleeve or bearing portion 82 surrounds pin 76 and bearing sleeves or bushings 84 and 86 are preferably interposed between it and pin 76 to supply adequate wearing life between pin 76 and sleeve 82, which might be considered as the moveable element of the hinge, although strictly speaking, pin 76 moves one way while sleeve 82 moves the other when the gangs are being adjusted. Sleeve 82 is very strongly secured to rear gang frame bar 46 as will now be described.

Sleeve 82 is welded or otherwise permanently secured to a tubular strut 88, the intersection of sleeve 82 with element 88 resulting in a substantial surface for brazing, welding or the like, and strut 88 is welded or similarly secured to a spacer 90 which is in the present instance a member of channel section lying for a considerable distance along the length of forward frame bar 46. Spacer 90 has permanently united to its end adjacent strut 88, as seen in Fig. 2, a plate or bracket 92 which bridges the space between sleeve 82 and spacer 90 and is permanently secured to sleeve 82 and spacer 90. As shown in Fig. 5, plate 92 has a flange portion 94 which lies flat against frame bar 46 and has spaced vertically slotted holes 96 and 98. A U bolt 100 extends about frame bar 46 and through openings 96 and 98, nuts 102 and 104 engaging flange 94 to clamp the flange, and thereby bracket 92 securely against bar 46. Turning to Fig. 4, spacer 90 has a bracket 106 welded thereto (see Fig. 2) which extends rearwardly over bar 46 and carries a set screw 108 threaded therein in position to engage the top of bar 46. A lock nut 110 is provided to retain the set screw 108 in place. Accordingly with nuts 102 and 104 loose, screw 108 may be actuated to raise spacer 90 relatively to bar 46, thus tending to alter the position of pin 76 either vertically or about the axis of pivot element 74 or both. At the other end spacer 90 has the flange plate 112, Fig. 1, permanently united thereto and lying against bar 46 in the same manner as above-mentioned plate 92. A U bolt 114 preferably identical with the U bolt 100 also extends about bar 46 and through plate 112. It will now be apparent that adjustment of screw 108 will cause raising of spacer 90, U bolts 100 and 114 (when loose) acting as guides for spacer 90 while screw 108 is adjusted. Such adjustment will put a downward pressure on frame bar 46 so as to exert a continuous downward pressure on gang 12. Furthermore, with bolts 100 and 114 loose, rear gang 12 may be shifted laterally, or along the length of front frame bar 46 to correct the registration of the rear disks with the front for various conditions, after which the bolts may be securely tightened to maintain the adjustment.

Because of the relatively flexible characteristics of yoke elements 60 and 62, it is impossible to introduce by rocking of gangs 10 and 12 sufficient stress into hinge 16 to cause injury to the front gang frame, since members 60 and 62 will take a substantial amount of twisting without a large increase in twisting force over what is normal and desirable to control the alignment and cutting depth of the gangs. Therefore with the harrow running over rough ground and the gangs tending to rock from side to side, hinge 16 may yield to allow limited rocking of this nature with only a slight fraction of the buildup or stress concentration which would occur with conventional types of rigid hinges, and yet any necessary bearing torque or pressure is maintained in spite of an appreciable amount of such rocking.

Figure 6:
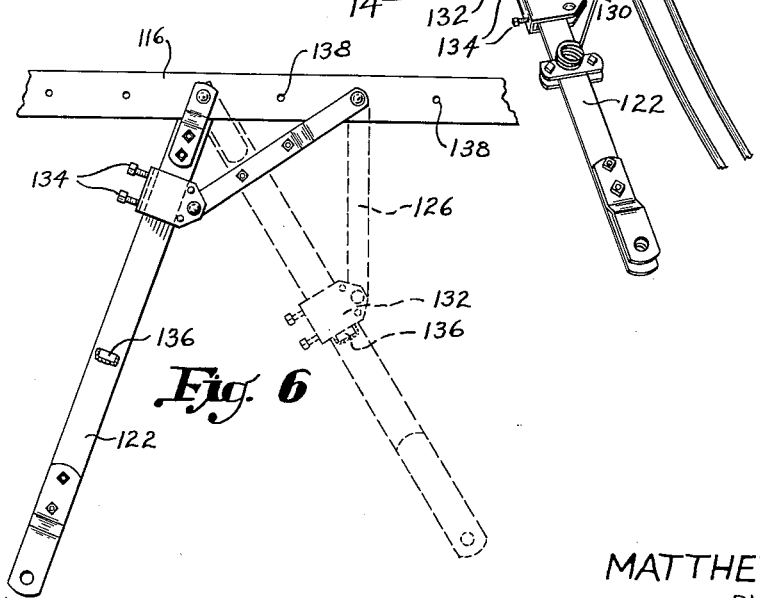
Fig. 6 is a plan view of a portion of the mechanism shown in Fig. 1 with the parts in different positions.

Draft structure 14 comprises a drawbar 116, Fig. 1, extending substantially parallel to front bar 36 and secured to brackets 118 and 120 fixed to forward frame bar 36 and other suitable parts of the gang structure in well-known manner. A drawbar 122 is pivoted at 124 to draft bar 116 and may swing about pivot 124 to effect lateral adjustment of the travel path of the harrow. A strut 126 is also pivoted at 128 to draft bar 116 and at 130 to a clamp 132 slidable along drawbar 122. Clamp 132 has set screws 134 engaging drawbar 122 to secure the clamp in position, the drawbar being held by strut 126 in predetermined angular relation to draft bar 116. If it is desired to change the angle, it is merely necessary to loosen set screws 134, whereupon drawbar 122 will be free to swing. Drawbar 122 is then swung to the desired position, as, for example, that of Fig. 6, whereupon set screws 134 are tightened, securing drawbar 122 in the new position. To secure the parts against inadvertent swinging to a position in which strut 126 would not be sufficiently effective, a stop 136 is secured to drawbar 122 and encounters clamp 132 when the limit of swinging is reached. Additional holes 138 are provided in draft bar 116 in case the adjustment provided is not sufficient, whereupon pivots 124 and 128 may be readily relocated to give a new basic adjustment from which a desired position of the drawbar can be reached.

It will be apparent that the harrow gangs are provided with bearings and braces and numerous parts which have no bearing on the invention and are accordingly not described or illustrated in detail but that a hinge construction has been devised which will accomplish the objects of the invention and that the drawbar may be readily adjusted as desired. It is to be understood that the invention is not to be taken as limited to the illustrated embodiment or in fact in any manner except as defined by the following claims.

What is claimed as new and desired to be secured by Letters Patent of the United States is:

1. In a disk harrow of the type having a pair of gangs hinged together, the combination of a front gang including a frame having a rear frame bar extending longitudinally of said frame and transversely of the direction of movement of the harrow, and a strut transverse to said rear frame bar, a rear gang having a frame including a front frame bar, and means for hinging the gangs together comprising a rearwardly open yoke including an upper and a lower leg and a connecting portion, said legs being rigidly connected with said strut forwardly of said rear frame bar and disposed in spaced relation to said rear frame far, a clamping portion including a spacer lying along said front frame bar, a first flange plate at one end of said spacer providing vertically spaced holes, a U bolt engaged in the holes in the first flange plate and disposed about said front frame bar, a second flange plate at the other end of said spacer providing vertically spaced holes, a U bolt engaged in the holes in the second flange plate and disposed about the front frame bar, a tubular arm extending forwardly from said spacer, a first hinge element on said arm connected with the first flange plate, a hinge element on said yoke engaged with the first hinge element for swinging the rear gang relative to the front, a first pivot element secured to said connecting portion and extending toward said rear frame bar, a second pivot element on said rear frame bar engaged with the first-mentioned pivot element for guiding said yoke in its vertical position in relation to said bar and said upper and lower legs being of a length to be yieldable for limited twisting of said yoke with rotation about said pivot elements for limiting controlled misalignment of said gangs.

2. In a disk harrow of the type having a pair of gangs hinged together the combination of a front gang including a frame having a rear frame bar extending longitudinally of said frame and transversely of the direction of movement of the harrow, and a strut transverse to said rear frame bar, a rear gang having a frame including a front frame bar, and means for hinging the gangs together comprising a rearwardly open yoke including an upper and a lower leg and a connecting portion, said legs being rigidly connected forwardly of said rear frame bar with said strut and in spaced relation to said frame bar, a clamping portion including a spacer lying along said front frame bar, a first flange plate at one end of said spacer providing vertically spaced holes, a U bolt engaged in the holes in the first flange plate and disposed about the first frame bar, adjusting mechanism engaged between said spacer and said front frame bar and actuable to shift said spacer up and down relative to the front frame bar, a second flange plate at the other end of said spacer providing vertically spaced holes, a U bolt engaged in the holes in the second flange plate and disposed about said front frame bar, a tubular arm secured to and extending forwardly from said spacer, a hinge element on said arm connected with the first flange plate, a hinge element on said yoke engaged with the first hinge element for swinging the rear gang relative to the front, a first pivot element secured to said connecting portion and extending toward said rear transverse bar, a second pivot element on said rear transverse bar engaged with the first pivot element for guiding said yoke in its vertical position in relation to said bar, and said upper and lower legs being of a length to be yieldable for limited twisting of said yoke with rotation about said pivot elements for limited controlled misalignment of said gangs.

3. In a disk harrow of the type having a front gang including a frame having a rear frame bar extending longitudinally of said frame and transversely of the direction of movement of the harrow, and a strut transverse to said rear frame bar, and a rear gang having a frame including a front frame bar, means for hinging the gangs together comprising the combination of a rearwardly open yoke including an upper and a lower leg and a connecting portion, said legs being rigidly connected forwardly of said rear frame bar with said strut and in spaced relation to said rear frame bar, a first hinge element fixed in relation to said front frame bar, a second hinge element on said yoke engaged with the first hinge element to provide for swinging the rear gang relative to the front, a first pivot element on said connecting portion extending toward said rear frame bar, a second pivot element on said rear frame bar engaged with the first pivot element for guiding said yoke in its vertical position in relation to said bar and said upper and lower legs being of a length to be yieldable for limited twisting of said yoke with rotation about said pivot elements for limited controlled misalignment of said gangs.

4. In a disk harrow of the type having a front gang including a frame having a rear frame bar extending longitudinally of said frame and transversely of the direction of movement of the harrow, a rear gang having a frame including a front frame bar, means for hinging the gangs together comprising the combination of a clamping portion including a spacer lying along said front frame bar, a first flange plate at one end of said spacer providing vertically spaced slotted holes, a U bolt engaged in the holes in the first flange plate and disposed about said front frame bar, a second flange plate at the other end of said spacer providing vertically spaced holes, a U bolt engaged in the holes in the second flange plate and disposed about said front frame bar, a tubular arm secured to and extending forwardly from said spacer, a hinge element on said arm connected with the first flange plate, a hinge element on said rear frame bar engaged with the first hinge element to provide for swinging of the rear gang relatively to the front, a bracket fixed in relation to said spacer adjacent said first flange plate and overlying said front frame bar, and screw means engaging said bracket and said front frame bar operable when said U bolts are loosened to raise said spacer at one end and thereby adjust the alignment of the front and rear gang frames.

5. In a disk harrow of the type having a pair of gangs hinged together, the combination of a front gang including a frame having a rear frame bar extending longitudinally of said frame and transversely of the direction of movement of the harrow and a strut transverse to said rear frame bar, a rear gang having a frame including a front frame bar, and means for hinging the gangs together comprising an assemblage including a first spacer, and upper and a lower leg fixed to and extending forwardly from said spacer, said legs being fastened respectively to the upper and lower surfaces of said strut forwardly of said rear frame bar in spaced relation thereto, a clamping portion including a second spacer lying along said front frame bar, a first flange plate at one end of said second spacer providing vertically spaced holes, a U bolt engaged in the holes in the first flange plate and disposed about said front frame bar, adjusting mechanism engaged between said second spacer and said front frame bar and actuable to shift said second spacer up and down relatively to said front frame bar, a second flange plate at the other end of said spacer providing vertically spaced holes, a U bolt engaged in the holes in said second flange plate and disposed about said front frame bar, a tubular arm fixedly secured to and extending forwardly from said second spacer, a first hinge element on said tubular arm connected with the first flange plate, a second hinge element on said legs rearwardly of said first spacer, engaged with the first hinge element providing for angling of said rear gang relatively to said front gang, a first pivot element secured to said first spacer and extending toward said rear frame bar, a second pivot element on said rear frame bar engaged with said first pivot element for guiding said first spacer element and said legs in their vertical position in relation to said rear frame bar, and said upper and lower legs being of a length to be yieldable for limited twisting of said assemblage with rotation about said pivot elements for limited controlled misalignment of said gangs.

References Cited in the file of this patent

UNITED STATES PATENTS

| | | |
|---|---|---|
| 1,941,504 | White | Jan. 2, 1934 |
| 2,392,018 | White | Jan. 1, 1946 |
| 2,604,746 | Frank et al. | July 29, 1952 |
| 2,608,813 | Frank | Sept. 2, 1952 |
| 2,608,814 | Frank | Sept. 2, 1952 |
| 2,685,159 | Brundage | Aug. 3, 1954 |

UNITED STATES PATENT OFFICE
CERTIFICATE OF CORRECTION

Patent No. 2,981,345 April 25, 1961

Matthew E. Hamilton

It is hereby certified that error appears in the above numbered patent requiring correction and that the said Letters Patent should read as corrected below.

Column 4, line 42, for "far" read -- bar --; line 61, for "limiting" read -- limited --; column 6, line 19, for "and", first occurrence, read -- an --.

Signed and sealed this 17th day of October 1961.

(SEAL)
Attest:

ERNEST W. SWIDER
Attesting Officer

DAVID L. LADD
Commissioner of Patents

USCOMM-DC